(12) United States Patent
Nishikawa

(10) Patent No.: US 8,077,784 B2
(45) Date of Patent: Dec. 13, 2011

(54) OFDM DEMODULATION DEVICE

(75) Inventor: Tomoki Nishikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 804 days.

(21) Appl. No.: 12/094,364

(22) PCT Filed: May 21, 2007

(86) PCT No.: PCT/JP2007/060378
§ 371 (c)(1),
(2), (4) Date: May 20, 2008

(87) PCT Pub. No.: WO2007/136036
PCT Pub. Date: Nov. 29, 2007

(65) Prior Publication Data
US 2009/0268852 A1    Oct. 29, 2009

(30) Foreign Application Priority Data
May 24, 2006    (JP) .................. 2006-143960

(51) Int. Cl.
*H04K 1/10* (2006.01)
(52) U.S. Cl. ........... 375/260; 340/384.72; 370/480; 375/340; 708/290; 708/313; 708/847
(58) Field of Classification Search .............. None
See application file for complete search history.

(56) References Cited

U.S. PATENT DOCUMENTS

| | | | |
|---|---|---|---|
| 2002/0015401 A1 * | 2/2002 | Subramanian et al. ....... | 370/347 |
| 2005/0174929 A1 | 8/2005 | Hayashi et al. | |
| 2005/0213680 A1 | 9/2005 | Atungsiri et al. | |

FOREIGN PATENT DOCUMENTS

| | | | |
|---|---|---|---|
| EP | 0 898 381 A2 | | 8/1998 |
| EP | 1 054 541 A2 | | 9/1999 |
| EP | 1 540 848 B1 | | 2/2009 |
| JP | 2000-286817 | | 10/2000 |
| JP | 2004-96703 | | 3/2004 |
| JP | 2004-282613 | | 10/2004 |
| JP | 2006-24992 | | 1/2006 |
| JP | 2006-121167 | | 5/2006 |
| JP | 2006121167 | * | 5/2006 |
| WO | WO 99/01956 A1 | | 1/1999 |

OTHER PUBLICATIONS

Iguchi, N., et al., "Channel Estimation using Diagonal Interpolation in Digital Terrestrial Broadcasting Receiver," 2005 IEEE Communications Society, Sep. 2005, p. 531.

* cited by examiner

*Primary Examiner* — David C. Payne
*Assistant Examiner* — Adolf Dsouza
(74) *Attorney, Agent, or Firm* — McDermott Will & Emery LLP

(57) ABSTRACT

An OFDM (Orthogonal Frequency Division Multiplexing) demodulator includes: an FFT (Fast Fourier Transform) circuit for performing a fast Fourier transform on an OFDM signal; a circuit for extracting an SP (Scattered Pilot) signal from the fast Fourier transformed signal; a circuit for adding a positive or negative sign to the extracted SP signal; a memory for temporarily storing the signed SP signal and an information transmission signal; a carrier interpolation circuit for performing time axis interpolation and frequency axis interpolation on the signed SP signal by a plurality of methods; a complex division circuit for performing a complex division of the information transmission signal by interpolated data; and a memory interface for detecting a timing a prescribed number of signed SP signals have been obtained and an output timing of the interpolated data according to the interpolation method.

9 Claims, 14 Drawing Sheets

OFDM DEMODULATION DEVICE

RELATED APPLICATIONS

This application is the U.S. National Phase under 35 U.S.C. §371 of International Application No. PCT/JP2007/060378, filed on May 21, 2007, which in turn claims the benefit of Japanese Application No. 2006-143960, filed on May 24, 2006, the disclosures of which Applications are incorporated by reference herein.

TECHNICAL FIELD

The invention generally relates to a demodulator that is used for digital broadcasting of an OFDM (Orthogonal Frequency Division Multiplexing) method. More particularly, the invention relates to a technology of improving reception capability in OFDM demodulation.

BACKGROUND ART

An OFDM method has been used in digital terrestrial broadcasting known as DVB-T (Digital Video Broadcasting Terrestrial) in Europe. The OFDM method is also used in digital terrestrial broadcasting known as ISDB-T (Integrated Services Digital Broadcasting Terrestrial) in Japan.

The OFDM method is one of multicarrier modulation methods. In the OFDM method, digital information is transmitted by modulating on a symbol by symbol basis a multiplicity of carriers that are orthogonal in frequency to each other. In a synchronous detection segment, an SP (Scattered Pilot) signal having a known amplitude and phase is placed every 12 carriers within a symbol. The SP signal is shifted by three carriers in each symbol in a frequency axis direction and placed in every four symbol periods in a time axis direction. A differential detection segment does not include an SP signal (see Patent document 1).

In general, an OFDM demodulator equalizes a received signal by extracting an SP signal from a synchronous detection segment, estimating transmission path characteristics by interpolating the extracted SP signal in a frequency axis direction and a time axis direction, and dividing an information transmission signal by the estimated transmission path characteristics (see Patent document 1).

Transmission path characteristics vary significantly in a mobile reception environment such as cellular phones and car navigation systems. In a known technology, estimation accuracy of transmission path characteristics is improved as follows: a received signal is demodulated by using transmission path characteristics estimated by interpolating an SP signal. Transmission path characteristics are then obtained again by using a hard decision result. More reliable ones of these transmission path characteristics are used (see Patent document 2).

Patent document 1: International Publication No. WO99/01956 pamphlet
Patent document 2: Japanese Patent Laid-Open Publication No. 2004-96703

DISCLOSURE OF THE INVENTION

Problems to be Solved by the Invention

There are various SP signal interpolation methods such as a method that is suitable for a stationary reception environment and a method that is suitable for a mobile reception environment. Mounting such a plurality of SP signal interpolation methods on a single OFDM demodulator increases the overall system size unless resources are not shared.

It is an object of the invention to provide an OFDM demodulator that enables a plurality of SP interpolation methods to be mounted thereon while reducing an increase in LSI (Large-Scale Integrated circuit) area by efficiently using a memory.

Means for Solving the Problems

In order to achieve the above object, an OFDM demodulator according to the invention receives an OFDM signal when a received signal is in a synchronous mode. The OFDM signal is a signal in which an SP signal is placed at a prescribed symbol interval in a time axis direction and at a prescribed carrier interval in a frequency axis direction, a continuous pilot signal and a control information signal are placed at a prescribed carrier position, and an information transmission signal is placed in a remaining portion. The OFDM demodulator includes: an FFT (Fast Fourier Transform) circuit for performing a fast Fourier transform on the OFDM signal; a circuit for extracting a scattered pilot signal from the fast Fourier transformed signal; a circuit for adding a positive or negative sign to the extracted scattered pilot signal in response to a signal indicating a position of the SP signal from a transmitting party; a memory for temporarily storing the signed SP signal and the information transmission signal; a carrier interpolation circuit for interpolating the signed SP signal in the time axis direction, and receiving only the interpolated data and an SP signal, inserting "0" between the interpolated data and the next interpolated data according to an SP interpolation method, and conducting a digital filtering process to conduct interpolation in the frequency axis direction; a complex division circuit for performing a complex division of the information transmission signal by the interpolated data; and a memory IF (interface) for detecting a timing a prescribed number of signed SP signals have been obtained, an output timing of the interpolated data, and other required prescribed timings and reading the SP signals and the information transmission signal from the memory. When the received signal is in a differential mode, a complex division is performed by using data two symbols before and data three symbols before.

Effects of the Invention

The invention enables improvement in reception capability in various reception conditions with low power consumption and a small area. Moreover, the invention improves mobile reception capability by performing an equalizing processing capable of suppressing degradation in capability at an end that is a drawback of a diagonal interpolation processing.

Accordingly, the invention is capable of improving estimation accuracy of transmission path characteristics in a time axis direction, and thus is capable of providing a receiving apparatus with excellent reception capability.

DESCRIPTION OF THE REFERENCE NUMERALS

Figure 1:
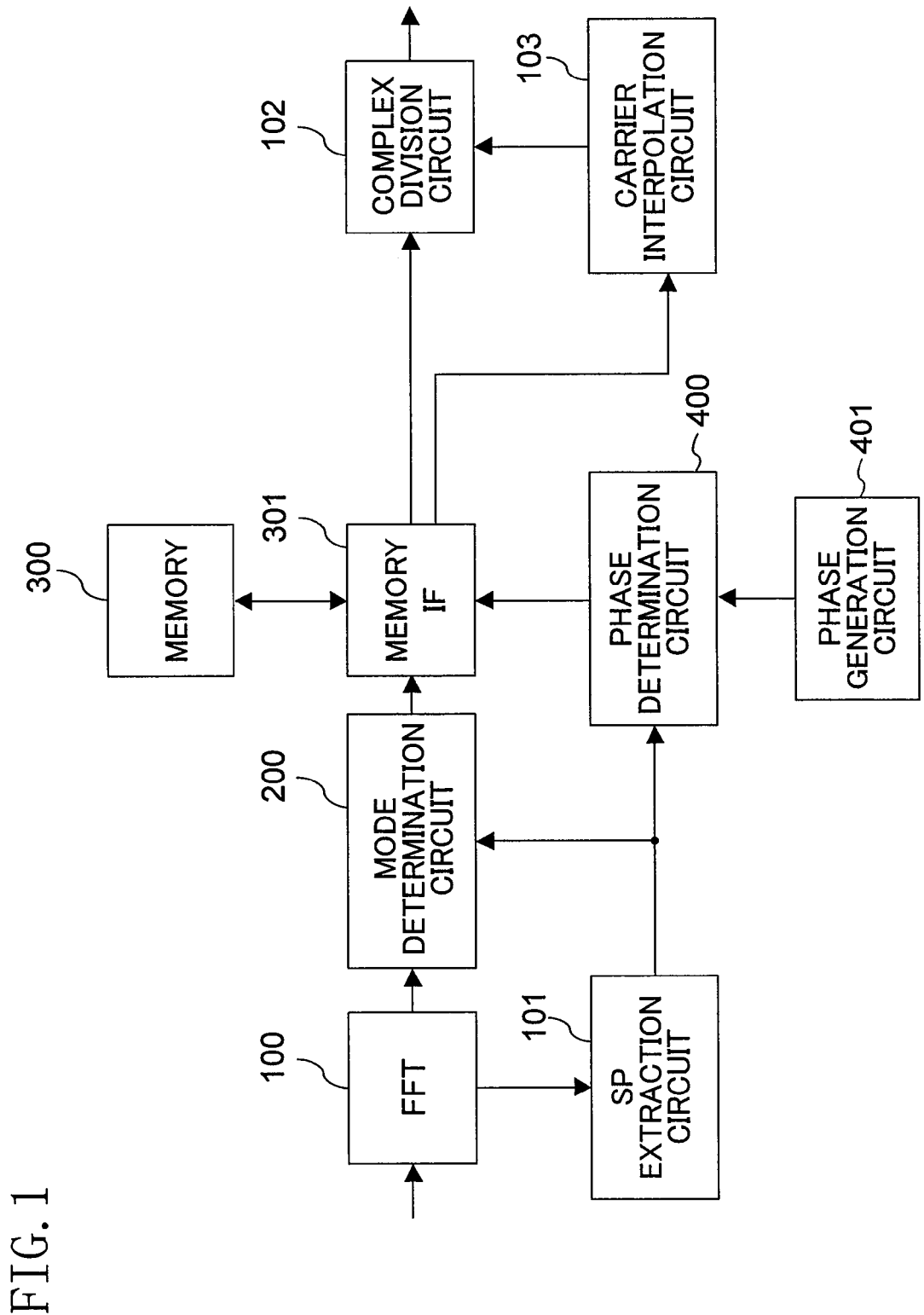
FIG. 1 schematically shows a structure of an OFDM demodulator according to the invention.

100 FFT circuit
101 SP (Scattered Pilot) extraction circuit
102 Complex division circuit
103 Carrier interpolation circuit
200 Mode determination circuit
300 Memory
301 Memory IF (interface)
400 Phase determination circuit
401 Phase generation circuit
402 SP (Scattered Pilot) generation circuit

BEST MODE FOR CARRYING OUT THE INVENTION

Hereinafter, embodiments of the invention will be described in detail with reference to the drawings.

FIG. 1 schematically shows a structure of an OFDM demodulator according to the invention. FIG. 1 shows especially a structure of a circuit for equalizing a received signal. The OFDM demodulator of FIG. 1 includes a mode determination circuit 200, a memory 300, a memory IF 301, a phase determination circuit 400, and a phase generation circuit 401 in addition to an FFT circuit 100, an SP extraction circuit 101, a complex division circuit 102, and a carrier interpolation circuit 103.

A received signal selected by a tuner section is down-converted to a prescribed frequency band, and then subjected to A-to-D (analog-to-digital) conversion and orthogonal detection. The resultant data is applied to the FFT circuit 100. The FFT circuit 100 converts the received data to a frequency domain. Entire output data from the FFT circuit 100 (including an SP signal) is applied to the memory IF 301 through the mode determination circuit 200. This path in which the entire output data passes through is herein referred to as an information transmission signal path. At the same time, a part (SP signals) of the entire output data from the FFT circuit 100 is extracted in the SP extraction circuit 101 and applied to the memory IF 301 through the phase determination circuit 400. This path is herein referred to as an SP signal path. All the data that is applied to the memory IF 301 is stored in the memory 300.

The mode determination circuit 200 determines OFDM input information such as whether the mode is a synchronous mode or a differential mode or the number of transmitted carriers, based on information from a not-shown circuit means, and informs the memory IF 301 of the determination result. The memory IF 301 adjusts the number of data storage regions, pointers of the data storage regions, and input/output pointers of transferred data in the memory 300, the number of output data signals, output timing, and the like, based on the information received from the mode determination circuit 200.

In the synchronous mode, a phase of SP signals (0 or $\pi$) is predetermined by the transmitting party, and the value is obtained based on a prescribed sequence. The phase generation circuit 401 manages the sequence and generates a signal that determines the phase of the SP signals. The phase determination circuit 400 applies a phase to the SP signals by using the signal generated by the phase generation circuit 401. More specifically, the phase determination circuit 400 matches the phase of the SP signals with each other by changing a sign to positive or negative. The phase-matched SP signals thus obtained are stored in the memory 300 through the memory IF 301.

The phase-matched SP signals, and the information transmission signal, and the SP signals before phase matching are separated according to the mode, but are both present in the memory 300. The data stored in the memory 300 through the SP signal path, that is, the phase-matched SP signals, are applied to the carrier interpolation circuit 103 at a prescribed timing. The carrier interpolation circuit 103 performs an interpolation processing of the SP signals. The data stored in the memory 300 through the information transmission path, that is, the information transmission signal and the SP signals before phase matching, are output from the memory IF 301 to the complex division circuit 102 at the timing the carrier interpolation circuit 103 completes the interpolation processing. The complex division circuit 102 performs a complex division for equalizing the received signal.

Figure 2:
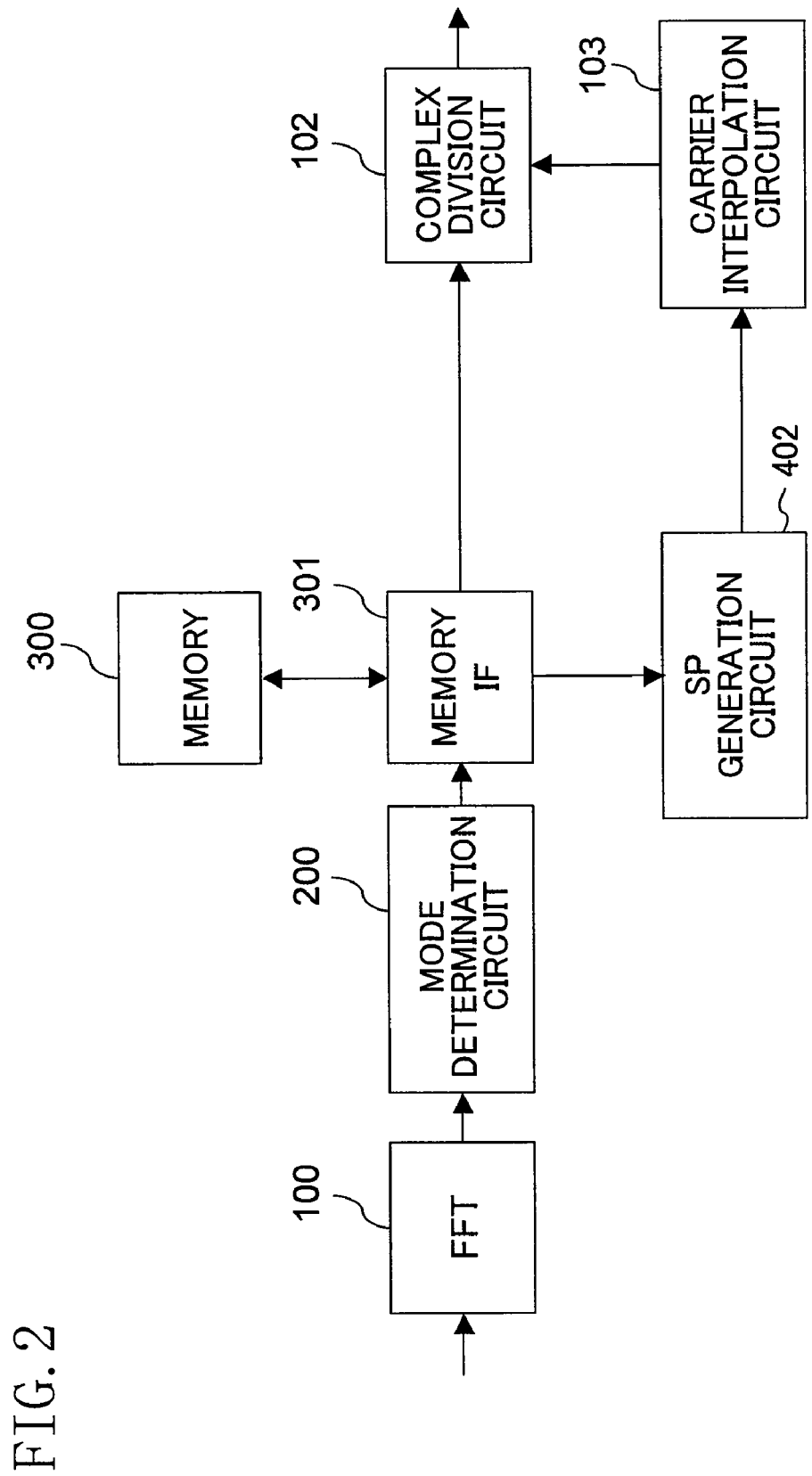
FIG. 2 schematically shows another structure of the OFDM demodulator according to the invention.

FIG. 2 schematically shows another structure of the OFDM demodulator according to the invention. The OFDM demodulator of FIG. 2 includes a mode determination circuit 200, a memory 300, a memory IF 301, and an SP generation circuit 402 in addition to an FFT circuit 100, a complex division circuit 102, and a carrier interpolation circuit 103. In this structure, valid data that is output from the FFT circuit 100 is written to the memory 300 through the memory IF 301 without being subjected to any processing. The memory IF 301 retrieves the SP signals before phase matching from the memory 300 and applies the retrieved SP signals to the SP generation circuit 402. The SP generation circuit 402 determines in which symbol the retrieved SP signal is located and what number SP signal the retrieved SP signal is in that symbol, based on the address of the SP signal in the memory 300 and the value of a counter in the SP generation circuit 402. The SP generation circuit 402 matches the phase of the SP signals with each other according to the determination result. The phase-matched SP signals thus obtained are applied to the carrier interpolation signal 103 and processed in the same manner as shown in FIG. 1.

In the structure of FIG. 1, separate memory regions are required for the entire valid data and the phase-matched SP signals. In the structure of FIG. 2, however, the phase-matched SP signals need not be stored in the memory 300. Therefore, the structure of FIG. 2 enables significant reduction in memory size.

Figure 3:
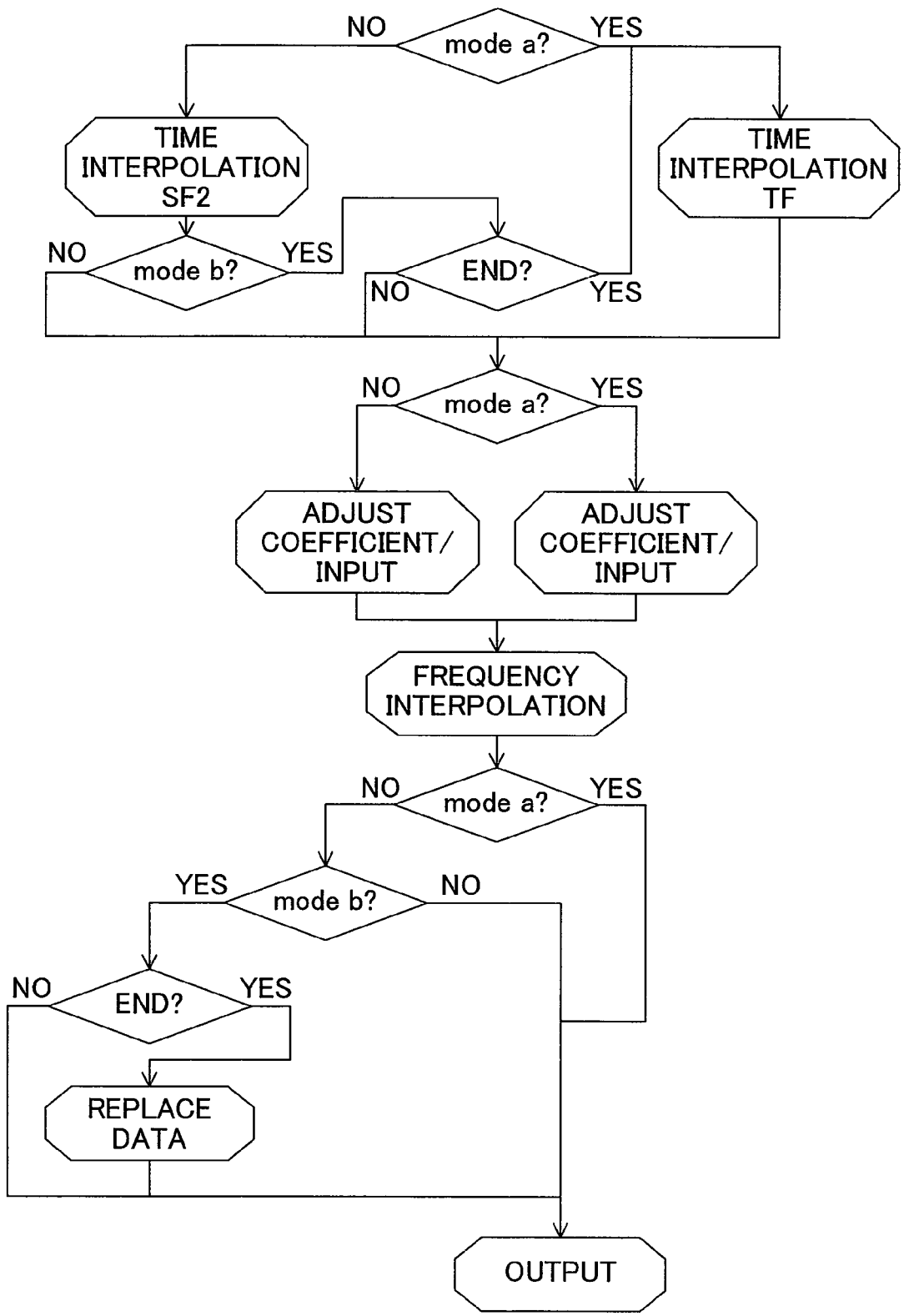
FIG. 3 is a flow chart of an internal processing of a carrier interpolation circuit in FIGS. 1 and 2.

FIG. 3 shows an example of an algorithm of the carrier interpolation circuit 103 shown in FIGS. 1 and 2. In FIG. 3, "mode a" is information that designates a time interpolation method of the carrier interpolation circuit 103. For example, this information shows whether a first time interpolation (TF) method or a second time interpolation (SF2) method is to be selected. "mode b" is information that designates whether an end processing of the SF2 method is to be changed or not.

According to FIG. 3, coefficient/input adjustment of a FIR (Finite Impulse Response) filter in the carrier interpolation circuit 103 is conducted according to the selected time interpolation method. For example, when the TF method is selected, the memory IF 301 switches to a memory for the TF method, and operations, coefficients of the FIR filter, a data output order and a data output timing from the memory IF 301, and a data input timing to the FIR filter are adjusted, and TF interpolation and frequency interpolation using the FIR filter are conducted.

Figure 4:
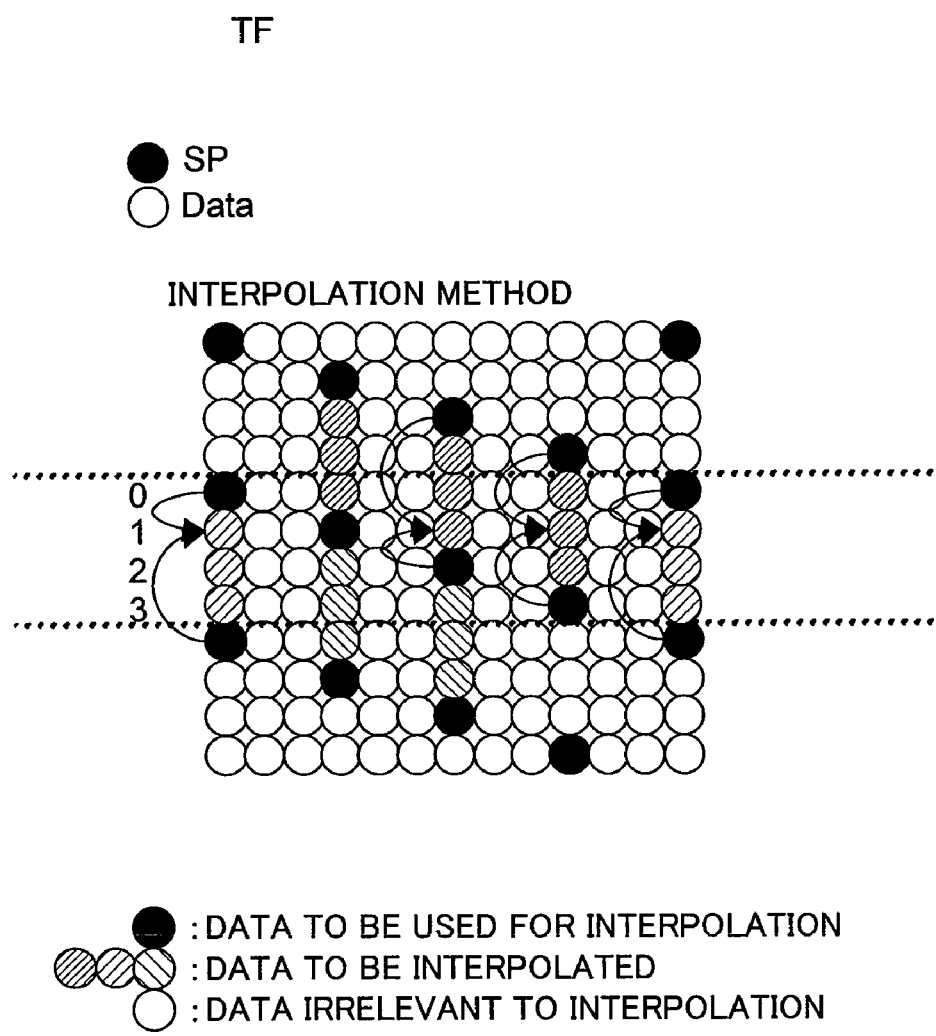
FIG. 4 is an image diagram of the case where first time interpolation (TF) is selected in FIG. 3.
Figure 5:
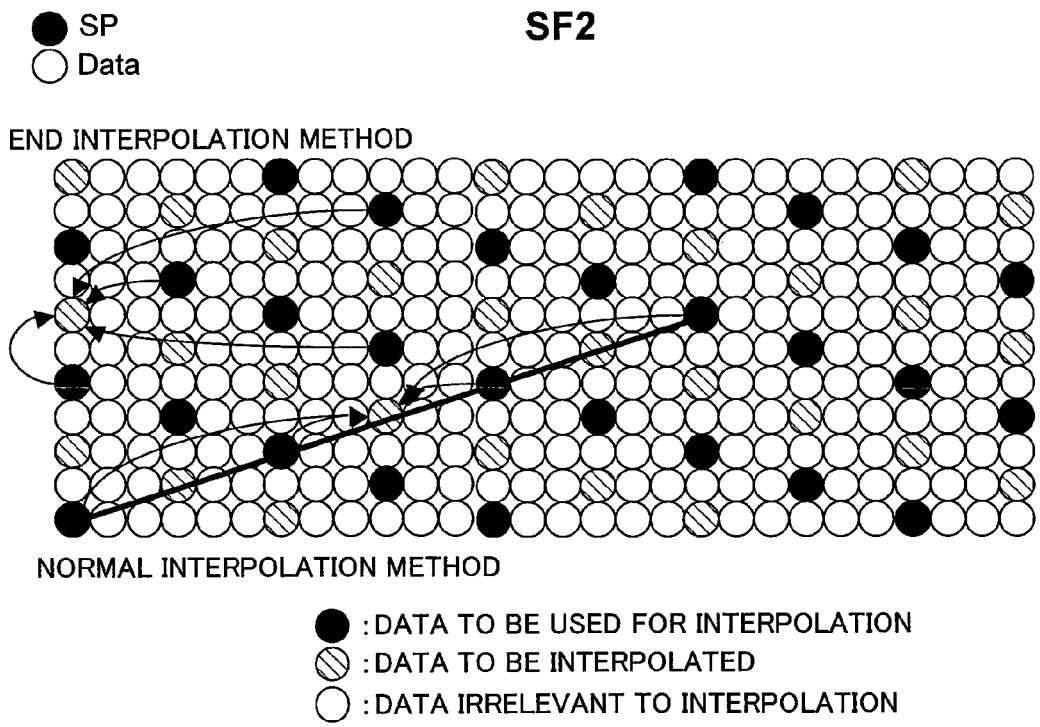
FIG. 5 is an image diagram of one end processing mode in the case where second time interpolation (SF2) is selected in FIG. 3.
Figure 6:
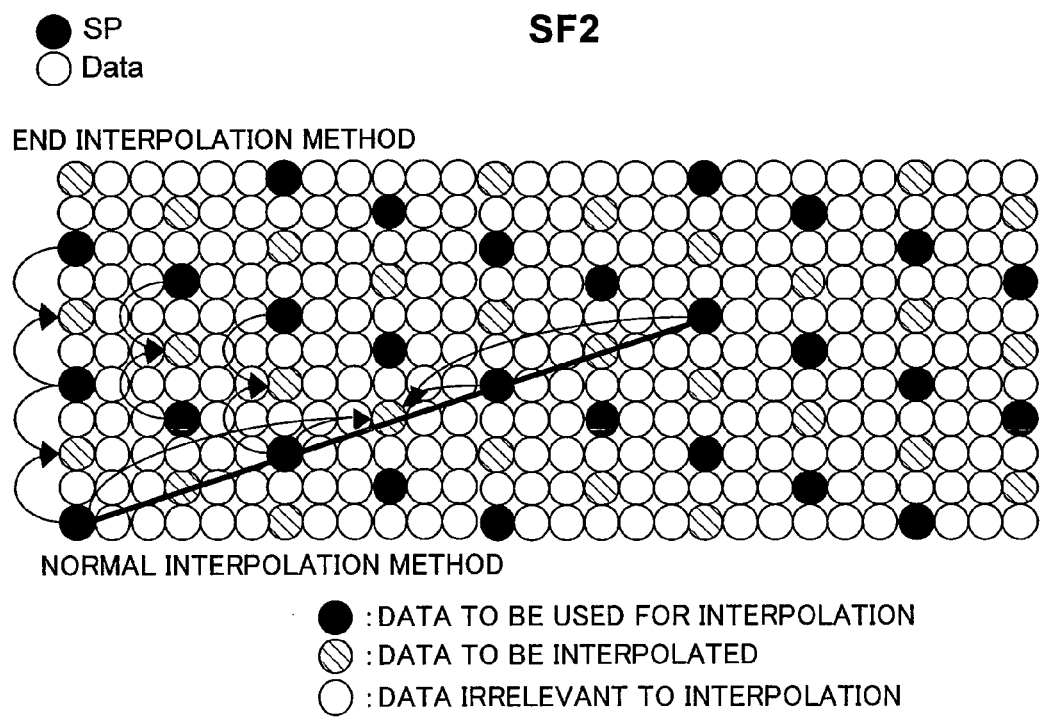
FIG. 6 is an image diagram of another end processing mode in the case where second time interpolation (SF2) is selected in FIG. 3.

FIG. 4 shows the case where the TF method is selected. FIG. 5 shows an end processing mode in the case where the SF2 method is selected. FIG. 6 shows another end processing mode in the case where the SF2 method is selected. In these figures, the vertical direction indicates a time axis direction and the horizontal direction indicates a frequency axis direction. All the data positions and the SP signal positions are shown by circles.

For example, in FIG. 4, interpolation of all the data positions is conducted as follows: in the time axis direction, data at the positions shown by shaded circles are interpolated by using two SP signals shown by black circles, and the resultant data passes through the FIR filter in the carrier interpolation circuit 103. For example, in the case where data (IPC) located right below the second SP signal (SPA) from the top left corner is interpolated by using the second SP signal (SPA) and the third SP signal (SPB) from the top left corner, the following weighting is performed:

$$IPC=(\frac{3}{4})\times SPA+(\frac{1}{4})\times SPB \quad [1].$$

Weighting coefficients may vary depending on the system.

In the synchronous mode, the complex division circuit 102 performs a complex division DP(n, j)/IP(n, j) as described above by using data IP(n, j) resulting from interpolation in the carrier interpolation circuit 103 and data DP(n, j) stored through the information transmission path (where n is a coordinate of the time axis and j is a coordinate of the frequency axis). The complex division circuit 102 then outputs the division result. In the differential mode, there is no SP signal. Therefore, the complex division circuit 102 performs a complex division by using DP(n+1, j) and DP(n, j) and outputs the division result.

As can be seen from FIG. 5 that shows the SF2 method, interpolation at an end such as the left end of FIG. 5 needs to be conducted by using data signals having different phase components. Therefore, data is distorted due to frequency deviation. When data passes through the FIR filter in interpolation of the frequency axis after the time interpolation, the distortion increases by an amount corresponding to the number of taps of the FIR filter. The overall capability is thus significantly degraded especially when the total number of data signals is small as in 1-seg and 3-seg broadcastings.

In view of this problem, in one mode, an end is detected by the carrier interpolation circuit 103. In this mode, as shown in FIG. 6, the TF method as shown in FIG. 4 is used at the end and the SF2 method as shown in FIG. 5 is used at locations other than the end. In another mode, the processing as shown in FIG. 5 is performed. Of the data that has passed through the FIR filter, data resulting from the data interpolated at the end is replaced with the data before passing through the FIR filter. The use of such an algorism can reduce expansion of distortion at the end caused by the FIR filter, which is advantageous to improvement in the overall capability.

Figure 7:
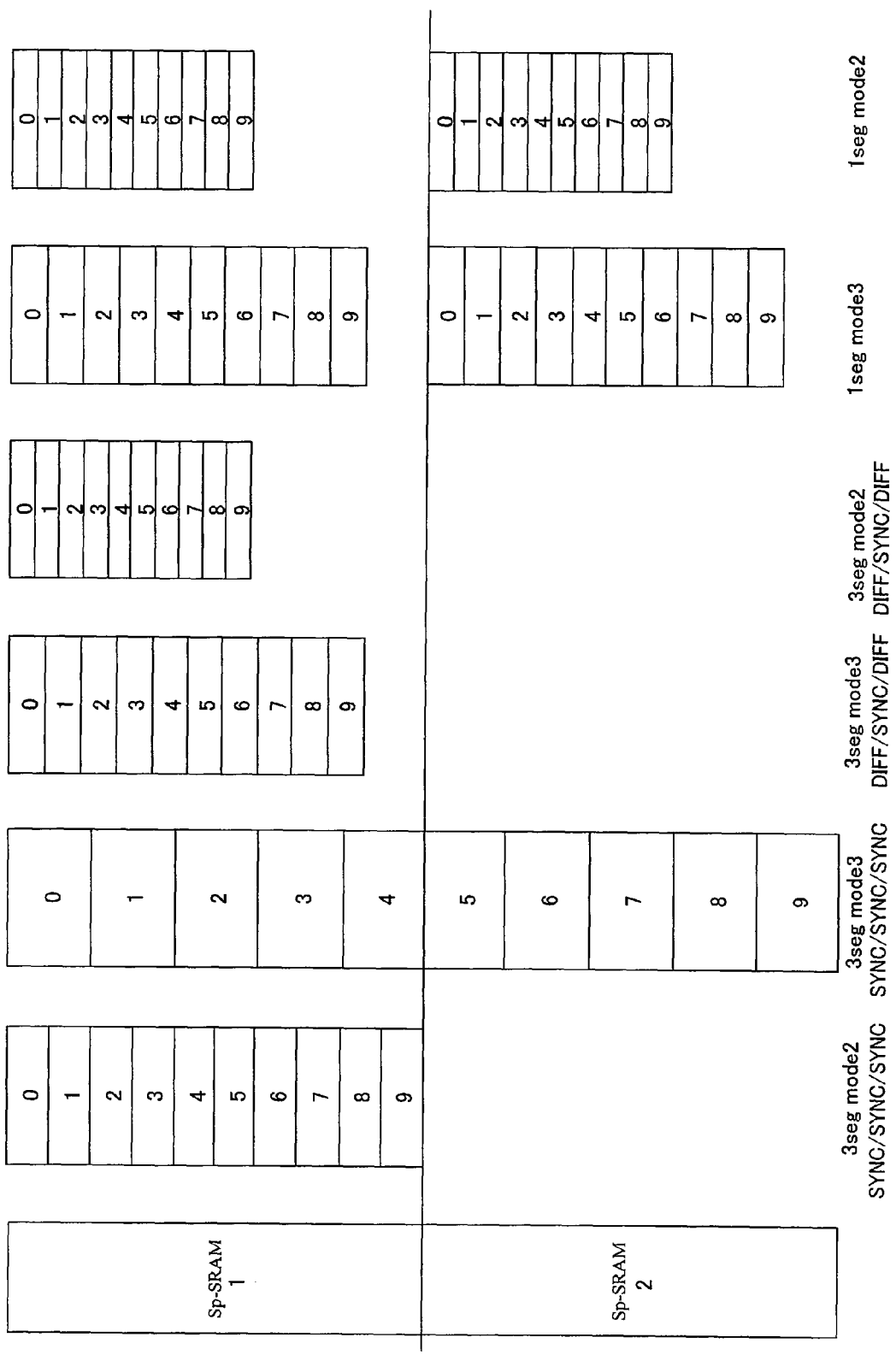
FIG. 7 shows regional division of an SP memory according to the invention.
Figure 8:
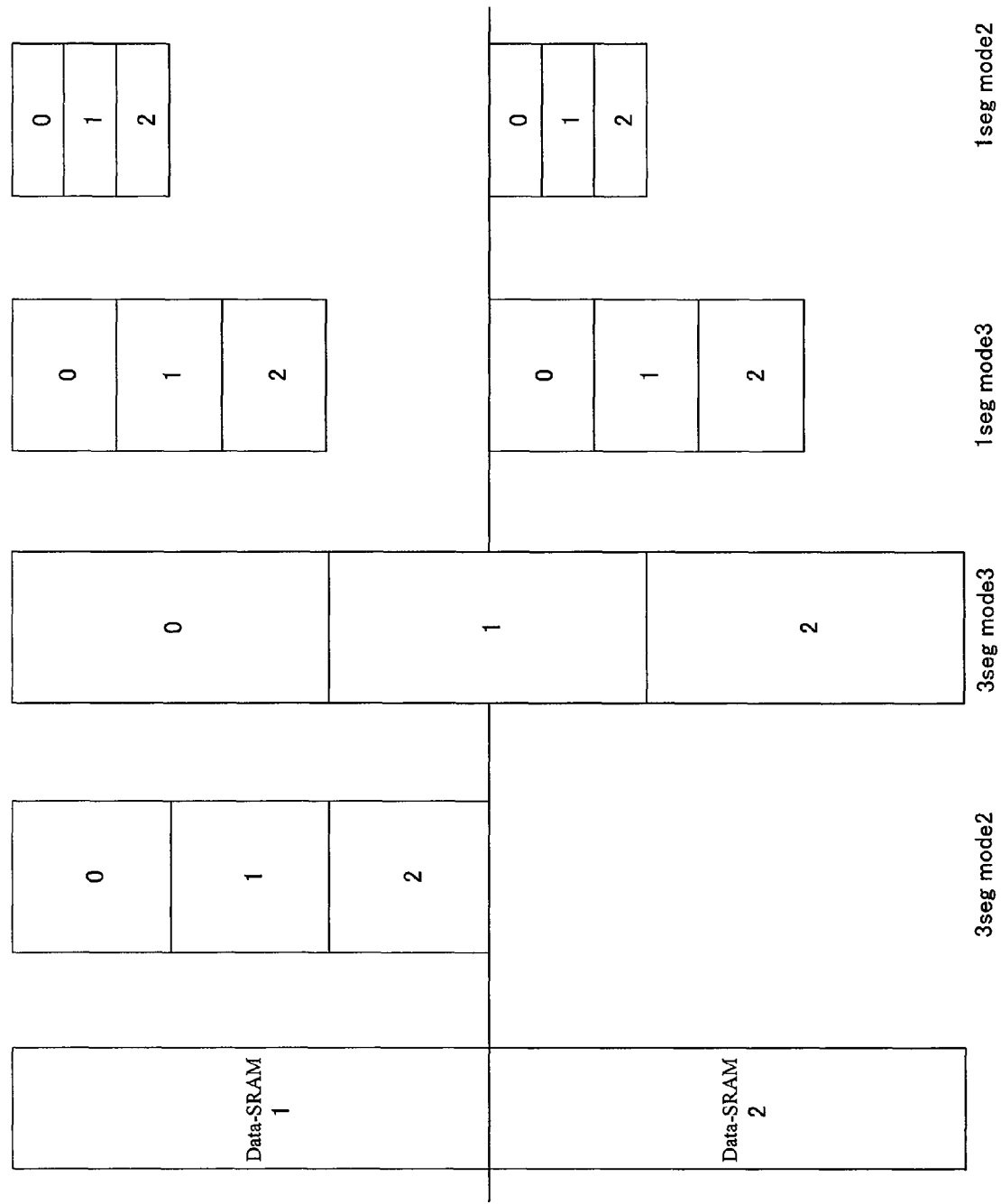
FIG. 8 shows regional division of a data memory according to the invention.

The memory 300 in FIGS. 1 and 2 has a plurality of SRAM (Static Random Access Memory) regions divided as shown in FIGS. 7 and 8. FIG. 7 shows regional division of an SP memory and FIG. 8 shows regional division of a data memory. In FIGS. 7 and 8, the memory 300 is shared so that the mode can be switched between a 1-seg x2 system and a 3-seg system.

Pointer generation of the memory 300 will now be described. Pointer generation varies depending on the mode and the interpolation method in the synchronous mode. Since the number of carriers to be used, the access method, and the like are different depending on the mode, the number of regions in the memory and the maximum address in a single region, and in some cases, the number of memories and the like vary as shown in FIG. 8.

There is no SP signal in the differential mode. Therefore, in the differential mode, all the regions of the memory 300 are used for storage of data from the information transmission signal path, and the carrier interpolation circuit 103 is not used and all the data is output to the complex division circuit 102. It is herein assumed that this mode is predetermined before the memory IF 301 is expected to operate normally.

Figure 9:
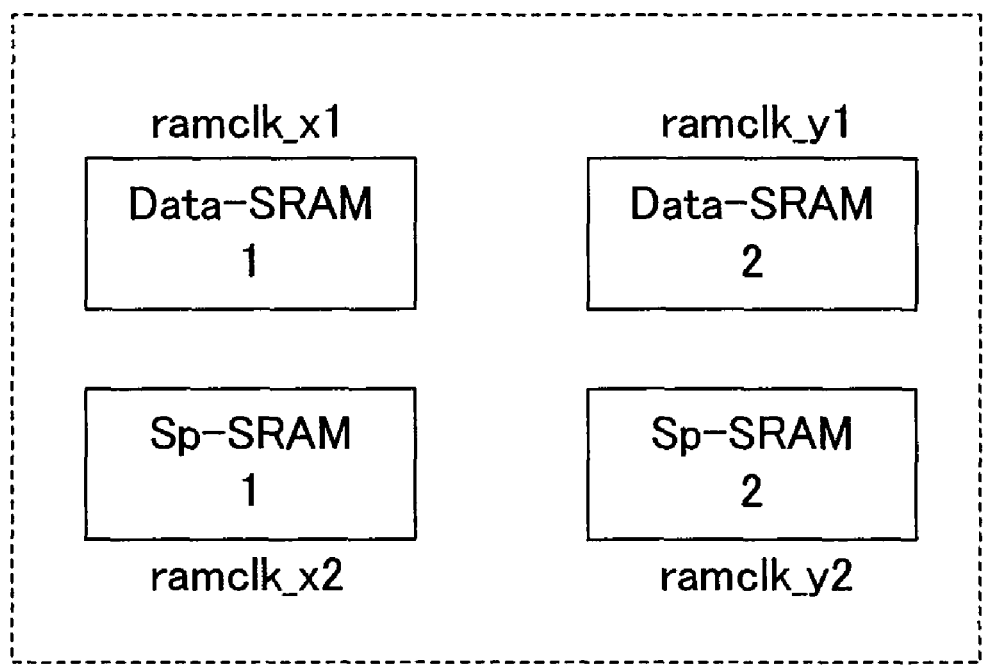
FIG. 9 shows clock division of the SP memory and the data memory according to the invention.

FIG. 9 shows clock division of the SP memory and the data memory. For example, one or more of the SRAM regions shown in FIG. 8 are not used in some cases. In order to suppress standby power consumption, the memory is divided according to the clock as shown in FIG. 9, and clock supply to the SRAM region(s) that are not used is stopped when the mode is selected.

In FIG. 9, ramclk_x1 and ramclk_x2 operate in x-branch operation of 1-seg and in 3-seg and ramclk_y1 and ramclk_y2 operate in y-branch operation of 1-seg and in 3-seg. In a mode in which the largest amount of data needs to be processed in 3-seg (all segments are a synchronous mode in mode 3), all the SRAM regions that operate according to ramclk_x1 and ramclk_x2 and ramclk_y1 and ramclk_y2 are used. It is expected that the use of such a sharing method implements significant reduction in the amount of SRAM to be used and in power consumption.

Figure 10:
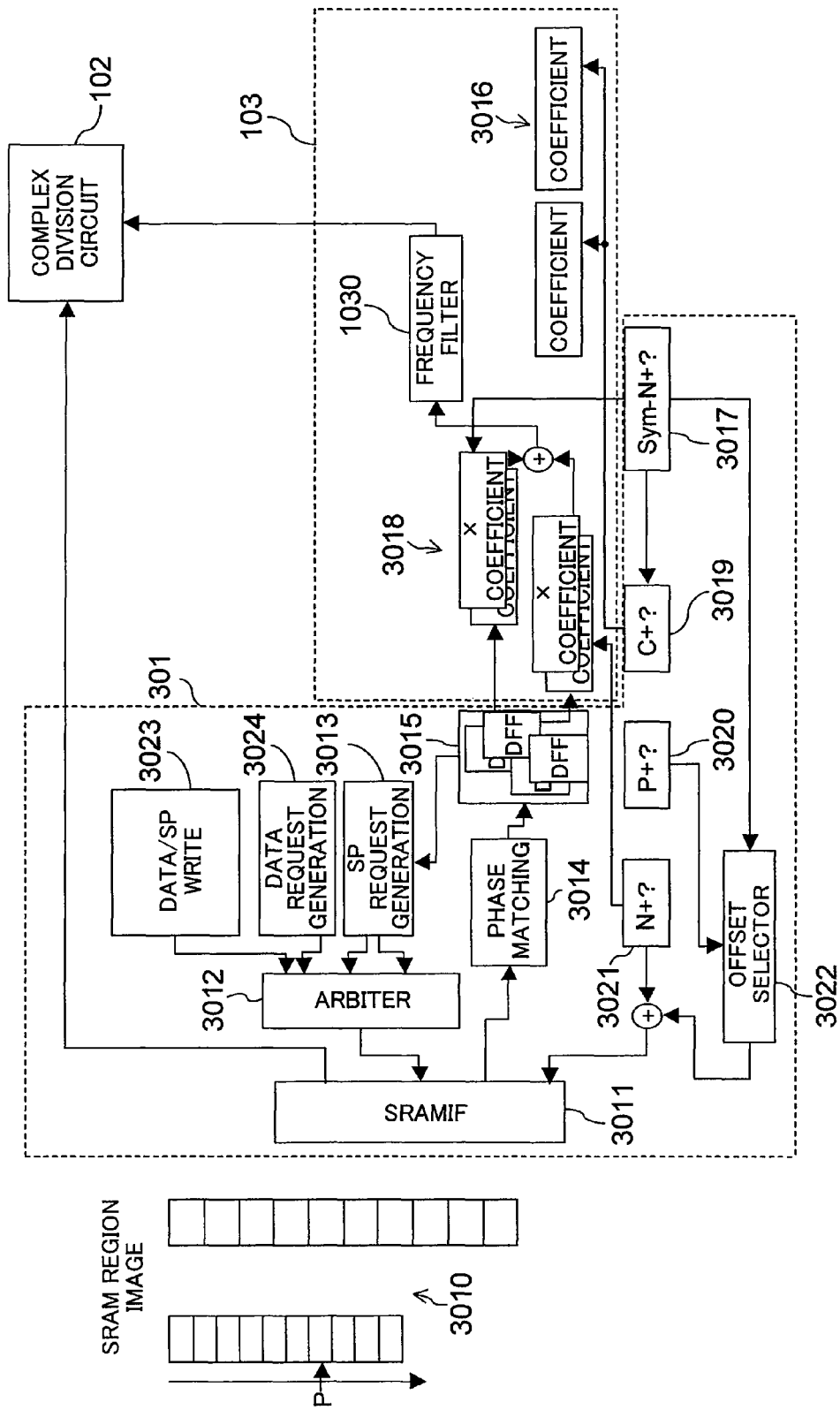
FIG. 10 shows in detail a memory IF and a carrier interpolation circuit of FIG. 1.

FIG. 10 shows in detail the memory IF 301 and the carrier interpolation circuit 103 of FIG. 1. FIG. 10 shows connection in the case where the SF2 method is selected. In FIG. 10, reference numeral "3010" indicates an SRAM region image, showing that the SRAM is divided into a plurality of SRAM regions as shown in FIGS. 7 and 8. Each SRAM region has an address offset, and in the case of the SP memory, SP signals of a single symbol are stored in each region.

The memory IF 301 includes an SRAM IF 3011, an arbiter 3012, an SP request generation circuit 3013, a phase matching circuit 3014, a buffer 3015, a Sym-N counter 3017, a C counter 3019, a P counter 3020, an N counter 3021, an offset selector 3022, a data/SP write requester 3023, and a data request generation circuit 3024. The carrier interpolation circuit 103 includes a frequency filter 1030, a first time interpolation circuit 3016, and a second time interpolation circuit 3018.

The following functions are required for the memory IF 301: (1) a function to generate a write request signal of input data from the information transmission signal path and the SP signal path; (2) a function to generate a read request signal of data stored from the information transmission signal path; (3) a function to generate a read request signal of data stored from the SP signal path; (4) a function to arbitrate access requests of functions (1), (2), and (3); (5) a function to match the phase of read data obtained by the request of function (3) for performing an interpolation operation; (6) a function to generate an address pointer of the SRAM 3010; (7) an actual access control function to the SRAM 3010; and (8) a buffer function to retain data before outputting to the carrier interpolation circuit 103. Function (1) is implemented by the data/SP write requester 3023. Function (2) is implemented by the data request generation circuit 3024. Function (3) is implemented by the SP request generation circuit 3013. Function (4) is implemented by the arbiter 3012. Function (5) is implemented by the phase matching circuit 3014. Function (6) is implemented by the Sym-N counter 3017, the C counter 3019, the P counter 3020, the N counter 3021, and the offset selector 3022. Function (7) is implemented by the SRAM IF 3011. Function (8) is implemented by the buffer 3015.

Memory access requests generated by the data/SP write requester 3023, the data request generation circuit 3024, and the SP request generation circuit 3013 are arbitrated by the arbiter 3012, and the result is output to the SRAM IF 3011. The SRAM IF 3011 determines whether the request received from the arbiter 3012 is a write request of input data from the information transmission signal path, a write request of input data from the signal path, a read request of data stored from the information transmission signal path, or a read request of data stored from the SP signal path. The SRAM IF 3011 then obtains a pointer from the Sym-N counter 3017, the C counter 3019, the P counter 3020, the N counter 3021, and the offset selector 3022 according to the determination result, and accesses the SRAM 3010.

Initial addresses of the SRAM regions that vary depending on the mode are stored in the offset selector 3022. An initial SRAM region is selected according to the value of the P counter 3020 and the value of the Sym-N counter 3017. The value of the P counter 3020 shows a main access region, and the Sym-N counter 3017 has the values of 0 through 3 for showing a prescribed pattern of SP signal arrangement. An address for read access to the SRAM 3010 is determined by adding the value of the N counter 3021 to the selected initial SRAM address. The value of the N counter 3021 shows what number SP signal is to be read. The C counter 3019 is a counter that is used in the time interpolation method shown in FIG. 4. The C counter 3019 determines coefficients in the first time interpolation circuit 3016 and the value of the C counter 3019 changes depending on the Sym-N counter 3017.

Data storage to the SRAM 3010 is conducted through the SRAM IF 3011 when the arbiter 3012 accepts a write request produced according to the timing the data/SP write requester 3023 writes a signal. This SRAM regional division image is valid in the synchronous mode. The SRAM is used as a data memory when the mode is switched to the differential mode. In this case, data that was not used in the synchronous mode is protected. Similarly, when the mode is switched from the differential mode back to the synchronous mode, data that was not used in the differential mode is protected.

Read operation from the SRAM 3010 is conducted by the following procedure: in the synchronous mode, the SP request generation circuit 3013 sends a data read request to the arbiter 3012 when SP signals corresponding to a prescribed number of regions (that is, a prescribed number of symbols) have been stored. Data is read from the SRAM 3010 through the SRAM IF 3011 after the arbiter 3012 accepts the data read request.

In the case where the read data from the SRAM 3010 is data regarding function (2), the read data is directly output to the complex division circuit 102. In the case where the read data is data regarding function (3), the read data is stored in the buffer 3015 through the phase matching circuit 3014. The read data stored in the buffer 3015 is output together with a data valid signal "VALID" to the carrier interpolation circuit 103 according to a data input request from the carrier interpolation circuit 103 at the timing that enables irregular output.

Based on the data stored in the buffer 3015, interpolation is performed in the first time interpolation circuit 3016 in one mode, and in the second time interpolation circuit 3018 in another mode. In response to a data transfer request from the frequency filter 1030, the interpolation result is output to the frequency filter 1030. It should be noted that this time interpolation may be performed either before or after the data is stored in the buffer 3015. This circuit structure eliminates the need for the data read timing that varies according to the system to be adjusted according to the system. Moreover, since the phase matching circuit 3014 conducts a phase matching operation every time the data is read from the SRAM 3010, the phase-matched data required for interpolation need not be retained. This is significantly advantageous to reduction in area.

The memory IF 301 of FIG. 10 is characterized in that the memory IF 301 has the buffer 3015 and communicates with the carrier interpolation circuit 103 by handshake access in order to minimize the number of accesses regarding function (3). The data timing for the data/SP write requester 3023 is uniquely determined by the mode, and the data timing for the data request generation circuit 3024 is uniquely determined by the mode, the interpolation method, and the output start timing. Therefore, the memory IF 301 of FIG. 10 is also characterized in that the arbiter 3012 assigns the highest priority to data input/output requests from the data/SP write requester 3023 and the data request generation circuit 3024 and assigns other frequency bands to the SP request generation circuit 3013. The mode herein refers to all the situations determined by the standards, such as the differences between the synchronous mode and the differential mode, between 1-seg and 3-seg, and the like, and modes I, II, and III defined by the standards.

The memory IF 301 is also characterized in the following point: in order to perform the operation shown by the above formula [1], the phase matching circuit 3014 needs to match the phases of the signals SPA and SPB with the phase that the data IPC is supposed to have. In this case, the amount of data may increase in terms of the data accuracy. In the structure of FIG. 10, however, the phase matching operation is performed right before the interpolation processing such as the formula [1] is conducted after data is output from the memory IF 301. The required size of SRAM 3010 is thus suppressed.

Data regarding function (3), that is, read data for the SP signal path, varies according to the interpolation method in the synchronous mode. The interpolation method includes the examples of FIGS. 4 through 6 as described above.

In FIGS. 4 through 6, the horizontal direction (the frequency axis direction) indicates the data output direction to the carrier interpolation circuit 103. A prescribed number of data signals that is determined by the mode are present in every horizontal line. After all the data in a horizontal line is output, data in the next horizontal line in the vertical direction (the time axis direction) is output to the carrier interpolation circuit 103.

In write operation to the SRAM 3010 regarding function (1), the maximum address is determined according to the maximum number of regions that are assigned to input data from the information transmission signal path and input data from the SP signal path. Offset addresses that are uniquely determined for each region are stored in the offset selector 3022 of FIG. 10. The sum of an offset address according to the value of the P counter 3020 and the value of the N counter 3021 is used as a write pointer. The value of the P counter 3020 shows which region is being accessed and the value of the N counter 3021 shows the very location that is currently being accessed.

Read operation from the SRAM 3010 regarding function (2) is conducted in the same manner as the write operation to the SRAM 3010 regarding function (1).

The carrier interpolation circuit 103 of FIG. 10 will now be described. In FIG. 10, data that is output from the memory IF 301 is multiplied by coefficients in the first time interpolation circuit 3016 in the TF method and in the second time interpolation circuit 3018 in the SF2 method. The first and second time interpolation circuits 3016 and 3018 may be provided in the memory IF 301 and may be present before data storage in the buffer 3015 because the invention is characterized in that the operation is performed after data is read from the SRAM 3010. The data multiplied by the coefficients and interpolated is output to the frequency filter 1030. The frequency filter 1030 corresponds to the FIR filter described above.

SP signals may be used for purposes other than estimation of transmission path characteristics. It is herein assumed that, in addition to the above functions (1) through (3) for a memory access request, there is an SP signal read request for data operation called (3)' "CFI type."

Figure 11:
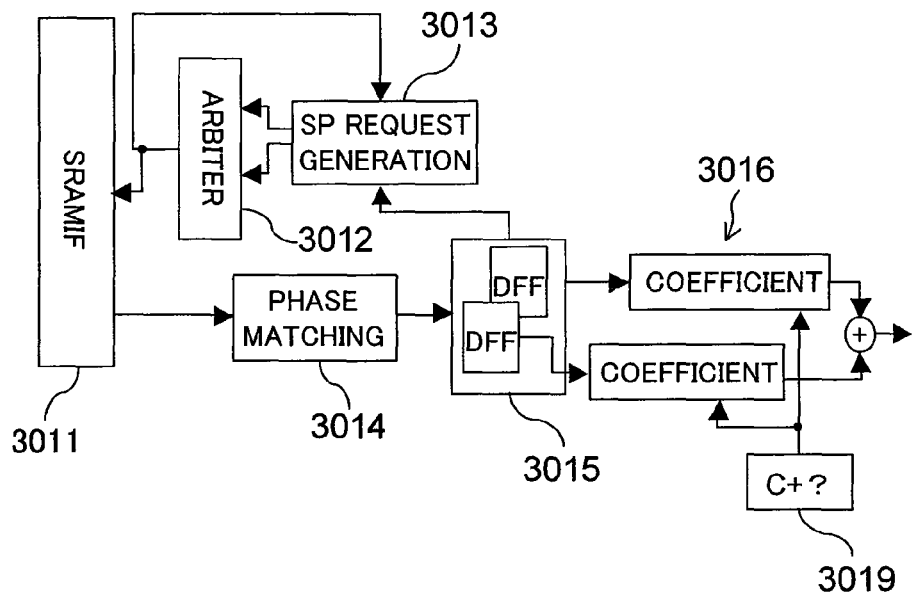
FIG. 11 shows in detail one form of a memory IF and a carrier interpolation circuit of FIG. 10.
Figure 12:
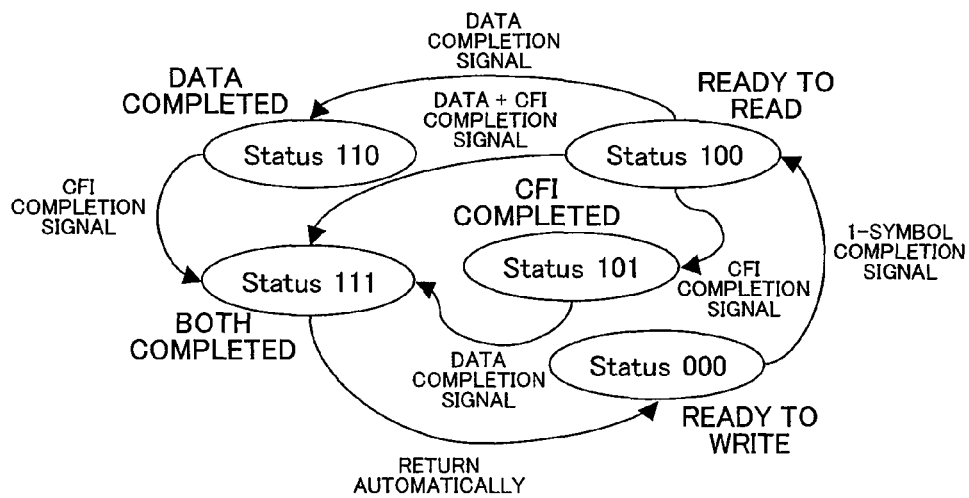
FIG. 12 is a status transition diagram of an SP request generation circuit of FIG. 11.

FIG. 11 illustrates in detail one form of the memory IF 301 and the carrier interpolation circuit 103 of FIG. 10. FIG. 12 shows a status transition of the SP request generation circuit 3013 of FIG. 11.

In the example of FIG. 12, the same SP signal needs to be read at different timings for functions (3) and (3)'. Therefore, it is necessary to know the timing that the SRAM region can be released to store the next SP signal. Therefore, access to the SRAM region is controlled by using a status that shows whether each of two types of read operations is completed or not and a status that shows whether data that can be read is present in the SRAM region or not. In a conventional example, separate SRAM regions are required for the read operation for transmission path estimation and the CFI read operation. In the example of the invention, however, the SRAM region can be shared by monitoring the read operation for transmission path estimation and the CFI read operation as shown in FIG. 12.

Figure 13:
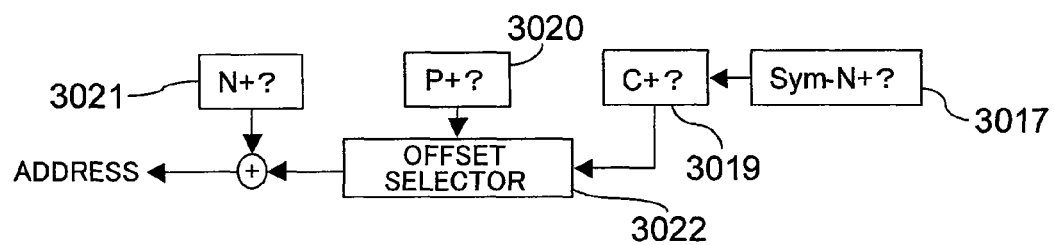
FIG. 13 shows pointer control in memory read operation in the processing of FIG. 4.
Figure 14:
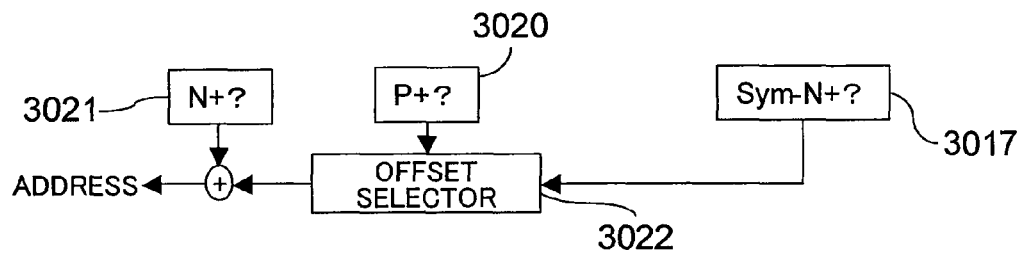
FIG. 14 shows pointer control in memory read operation in the processing of FIGS. 5 and 6.

Read operation from the SRAM 3010 regarding function (3) is conducted as shown in FIG. 13 or FIG. 14 depending on the interpolation method.

FIG. 13 shows pointer control in memory read operation in the processing of FIG. 4 (in the case where the TF method is selected). In FIG. 13, the P counter 3020 is a loop pointer that shows a reference memory access region and returns to the value of an initial region after counting to the maximum number of regions. The C counter 3019 is a pointer that shows from which region SP signals required for interpolation are to be retrieved, based on the P counter 3020. For example, the C counter 3019 may have a value of 0 through 3. When the C counter 3019 is 0, SP signals are retrieved from the SRAM region shown by the P counter 3020. When the C counter 3019 is 1, data SPo is retrieved from the SRAM region right after the SRAM region shown by the P counter 3020 and data SPn is retrieved from the SRAM region three regions before the SRAM region shown by the C counter 3019. For example, in the case where the operation shown by formula [1] is performed, (¾)×SPn+(¼)×SPo is output as interpolated data output. The N counter 3021 is a pointer that shows what number SP signal is to be retrieved with respect to the SP signal located at the left end. According to the P counter 3020 and the C counter 3019, the initial address of the SRAM region is obtained by the offset selector 3022. Therefore, an address pointer of the SP signal to be retrieved is obtained by adding the address of the N counter 3021 to the output of the offset selector 3022.

All the counters are a loop counter that returns to an initial value after reaching the respective maximum counter value. As described above, the maximum value of the P counter 3020 is determined by the predetermined maximum number of SRAM regions, and the P counter 3020 is incremented when a read access to one region is completed.

The N counter 3021 is incremented after every related memory access. Since the number of SP signals in the horizontal direction is determined by a predetermined mode, the maximum number of the N counter 3021 is uniquely determined.

The C counter 3019 has four values and is incremented after every related memory access. The value of the C counter 309 changes with the value of the Sym-N counter 3017.

The Sym-N counter 3017 is incremented every time the N counter 3021 counts to its maximum counter value. The Sym-N counter 3017 is a pointer that shows what number horizontal line (what number symbol) the current output data to the carrier interpolation circuit 103 belongs to in the vertical direction.

In this example, the C counter 3019 may be a pointer that designates interpolation coefficients and an operation method in the carrier interpolation circuit 103. This is shown in FIG. 11. The structure of FIG. 11 has connection slightly different from that shown in FIG. 10.

FIG. 14 shows pointer control in memory read operation in the processing of FIGS. 5 and 6 (in the case where the SF2 method is selected). The basic idea is the same as that in the TF method. However, the C counter 3019 is not required and a read pointer is uniquely determined by the respective values of the Sym-N counter 3017, the P counter 3020, and the N counter 3021 and the predetermined offset value in the offset selector 3022. The coefficients for interpolation vary depending on the value of the N counter 3021.

In this system, the timing for write operation from the information transmission signal path and the timing for write operation from the SP signal path are uniquely determined and related to each other in advance. Therefore, the two types of write requests are herein written together, but there is essentially no problem even when the two types of write requests are written separately.

Figure 15:
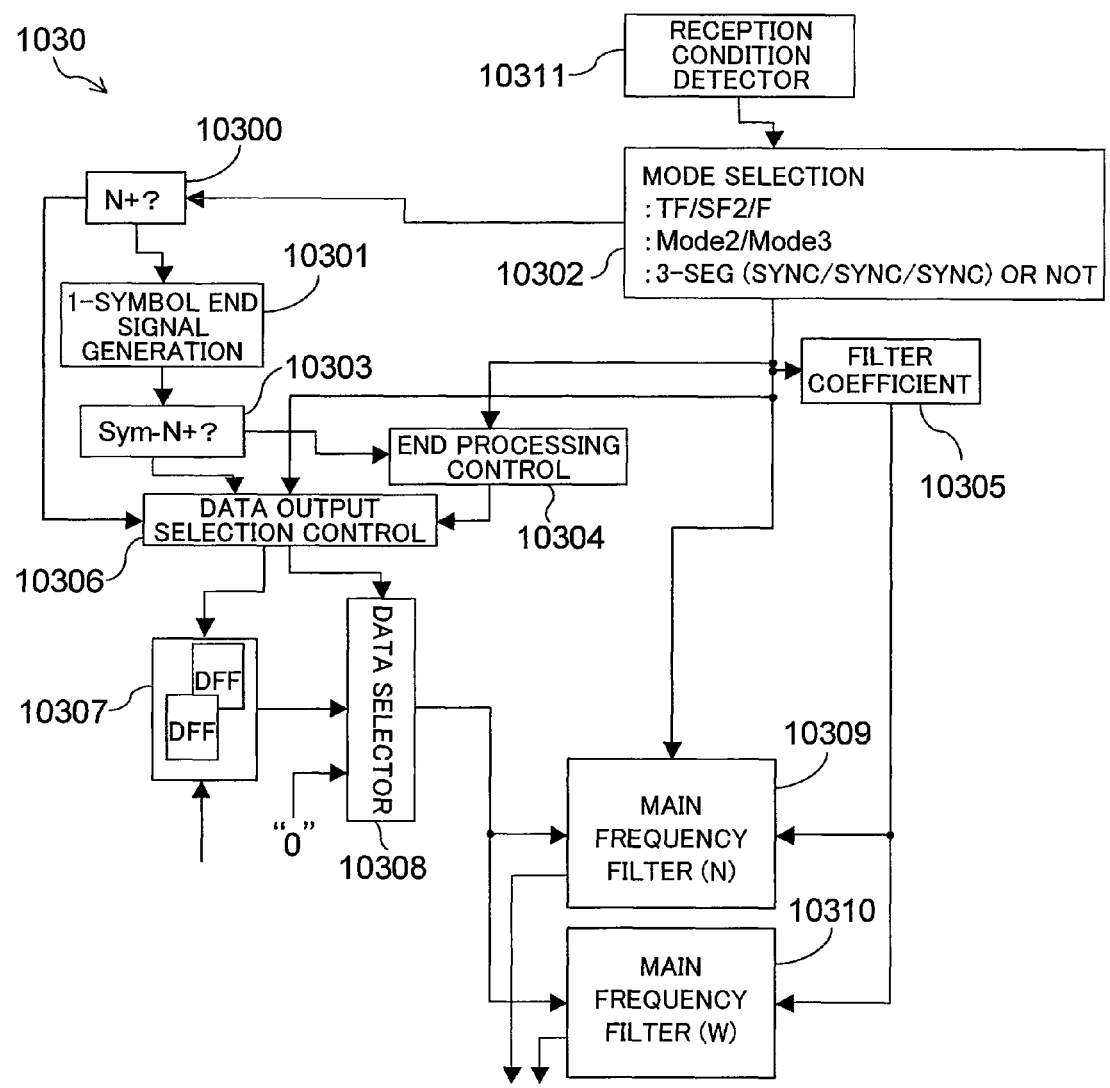
FIG. 15 shows in detail a frequency filter of FIG. 10.

FIG. 15 shows in detail the frequency filter 1030 of FIG. 10. The circuit of FIG. 15 is characterized in the following point: the circuit of FIG. 15 includes a data buffer 10307 having a circuit for communicating with the memory IF 301 by handshake access. When the data buffer 10307 is empty, a data request is always sent to the memory IF 301 in order to pre-read required interpolation data, and 0 data required between interpolation data and interpolation data is produced in a data selector 10308 at the input of the FIR filter. While the 0 data is being output to the FIR filter, the next interpolation data is obtained from the memory IF 301. The timing of outputting interpolation data is relieved by repeating this data transfer operation.

In this structure, data is transmitted by burst transfer up to the input of the memory IF 301. Since it is difficult to transmit the data at the same transfer rate in the path between the memory IF 301 and the carrier interpolation circuit 103, the data transmission method is changed to handshake access in the path between the memory IF 301 and the carrier interpolation circuit 103 and is returned to burst transfer again at the output of the carrier interpolation circuit 103 because burst transfer is required for the subsequent stage.

In the example of FIG. 15, the frequency filter 1030 includes a reception condition detector 10311 for detecting a reception condition and a mode selection circuit 10302. The number of SP signals per symbol, the FIR filter coefficients, and the number of carriers required for the input end processing of the FIR filter vary depending on the mode selected by the mode selection circuit 10302 according to the reception condition. A plurality of setting registers included in the mode selection circuit 10302 may be controlled by software. The number of SP signals per symbol is counted by the N counter 10300 and a circuit 10301 generates a 1-symbol end signal at the end of each symbol. A Sym-N counter 10303 is incremented in response to every symbol end signal. The Sym-N counter 10303 is a counter that shows a symbol position of the input signal (a position on the vertical axis in FIG. 4). There are two FIR filters as main frequency filters 10309 and 10310. One frequency filter 10309 is a narrow-band (N) filter and the other frequency filter 10310 is a wide-band (W) filter. Filter coefficients are pre-stored in a register 10305 as fixed values or variable values that are arbitrarily set. The end processing is controlled by an end processing control circuit 10304. The end processing control circuit 10304 serves to extend the left end of input data to the frequency filters 10309 and 10310 by a prescribed number. This number varies depending on the number of taps of the frequency filters 10309 and 10310, and the like. Based on the information of the Sym-N counter 10303 and the end processing control circuit 10304, a data output selection control circuit 10306 sends an instruction to the data selector 10308 and the data buffer 10307 storing the data received from the memory IF 301, and determines whether 0 data is output to the frequency filters 10309 and 10310 or data stored in the data buffer 10307 is output to the frequency filters 10309 and 10310. The data output selection control circuit 10306 then outputs a command to the data selector 10308 according to the determination result. The data selector 10308 outputs the data to the frequency filters 10309 and 10310 according to the command. The respective results of the frequency filters 10309 and 10310 are output to the complex division circuit 102. Note that the ratio of the number of times the data stored in the data buffer 10307 is output to the number of times the 0 data is output varies depending on the interpolation method.

For example, by this structure, a conventional method in which time axis interpolation and frequency axis interpolation are combined and a method called "1-symbol interpolation" in which only frequency axis interpolation is conducted can be implemented in a conventional single data path for outputting the time axis interpolation result.

Figure 16:
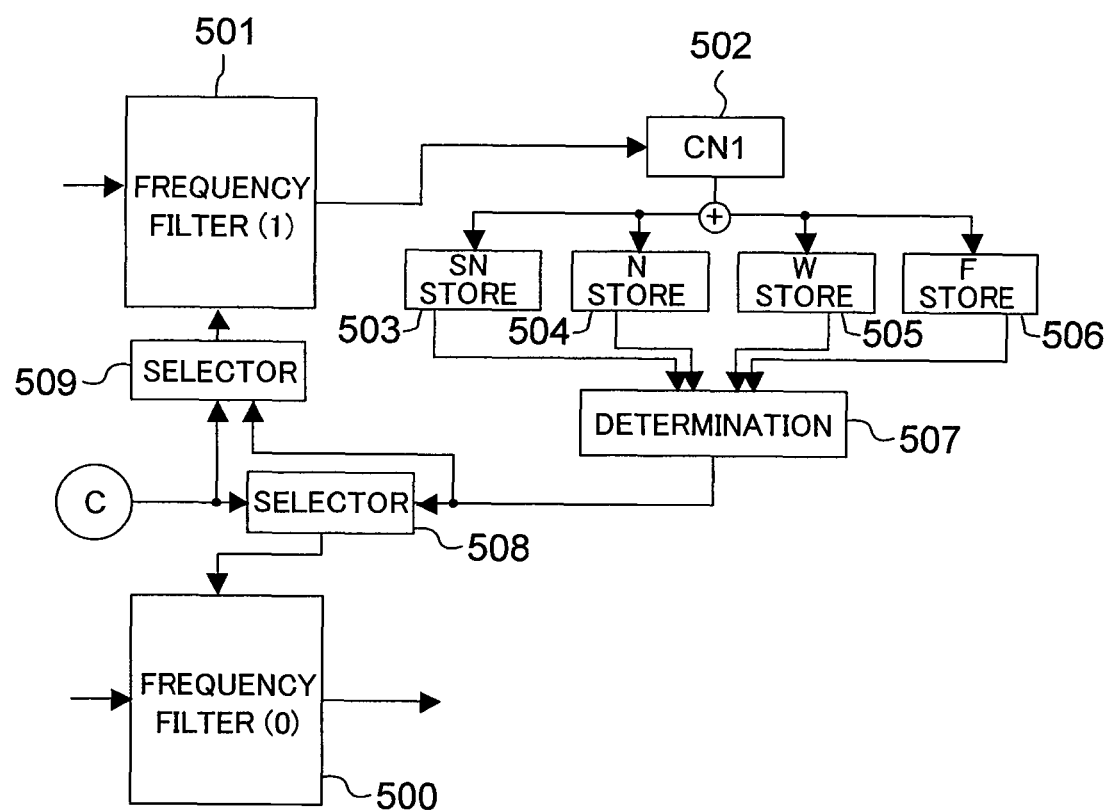
FIG. 16 shows a modification of two filters of FIG. 15.
Figure 17:
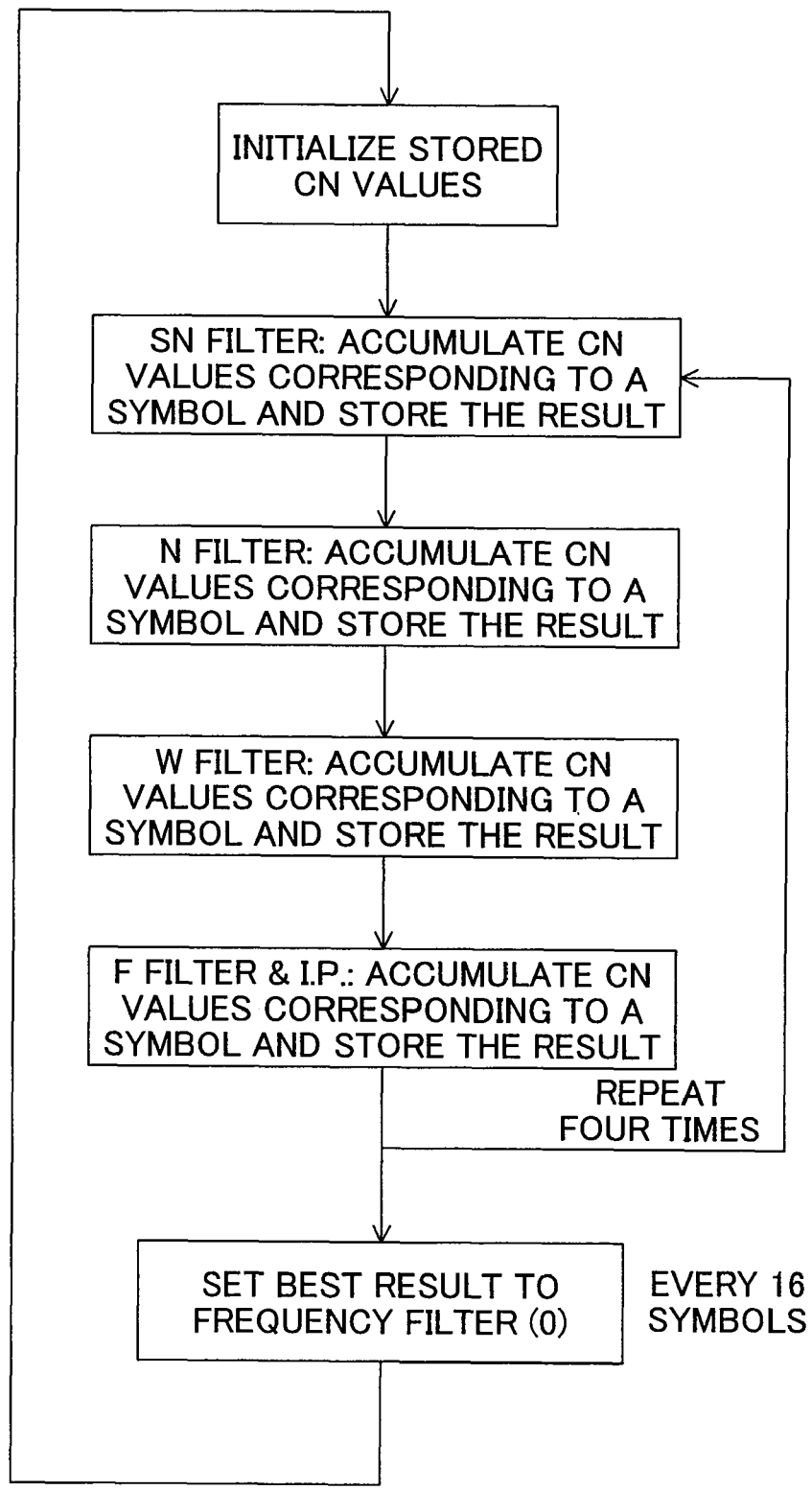
FIG. 17 is a flow chart of an operation of the circuit of FIG. 16.

FIG. 16 shows a modification of the two filters 10309 and 10310 in FIG. 15. FIG. 17 illustrates operation of the circuit of FIG. 16.

In FIG. 15, both filters 10309 and 10310 always operate in parallel and the better result is selected by the complex division circuit 102. On the other hand, the structure of FIG. 16 includes a main filter (0) 500 and a test filter (1) 501. Reference numerals 502, 503, 504, 505, and 506 indicate registers, 507 indicates a determination section, and 508 and 509 indicate selectors.

As shown in FIG. 17, characteristics of the test filter 501 are changed in four ways on a four symbol basis in every 16 symbols. The results are stored in the registers 503, 504, 505, and 506, and an optimal result is selected by the determination section 507. The selected result is set to the main filter 500 through the selector 508 and is fed back to the test filter 501. Since an adaptive filter is used as the main filter 500, using only two filters in this structure is substantially equivalent to using four filters.

In FIG. 17, the main filter 500 is set according to the results of the test filter 501 obtained on a four symbol basis. However, the invention is not limited to selecting the result of the test filter 501 from the results obtained on a four symbol basis. For example, depending on the system, the results obtained on a four symbol basis may be accumulated a plurality of times (e.g., N times, where N may be selectable such as in the range of 1 to 1,000) in the registers 503 through 506 and the selection result may be set to the main filter 500 on a 4×N symbol basis.

An example of a comparison method that is used as a means for selecting the result of the test filter 501 is a method for selecting the best CN value obtained from the four filter results. There are many methods for calculating a CN value. In some methods, an accurate CN value cannot be obtained and an obtained CN value may be better than the actual capability under a certain environment in 1-symbol interpolation. In this case, a wrong filter may possibly be selected. Therefore, before accumulating the CN values obtained from the four filter results, the registers 503 through 506 may degrade the CN values by a predetermined value provided from the outside.

INDUSTRIAL APPLICABILITY

As has been described above, the OFDM demodulator of the invention enables mounting of a plurality of SP interpolation methods while suppressing an increase in LSI area, and is useful as a receiving apparatus of digital terrestrial broadcasting, and the like.

What is claimed is:
1. An OFDM (Orthogonal Frequency Division Multiplexing) demodulator in a receiving apparatus for receiving an OFDM signal, wherein the OFDM signal is a signal in which a scattered pilot signal is placed at a prescribed symbol interval in a time axis direction and at a prescribed carrier interval in a frequency axis direction, a continuous pilot signal and a control information signal are placed at a prescribed carrier position, and an information transmission signal is placed in a remaining portion, the OFDM demodulator comprising:
an FFT (Fast Fourier Transform) circuit for performing a fast Fourier transform on the OFDM signal;
a circuit for extracting a scattered pilot signal from the fast Fourier transformed signal;
a circuit for adding a phase to the extracted scattered pilot signal based on a position of the scattered pilot signal from a transmitting party;
a memory for temporarily storing the phase-added scattered pilot signal and the information transmission signal;
a memory interface for conducting write memory at a prescribed timing, starting read operation when a prescribed number of scattered pilot signals have been written and outputting the scattered pilot signals, and starting read operation at another timing and outputting the written information transmission signal;
a carrier interpolation circuit for matching the phase of the scattered pilot signals received from the memory interface and performing interpolation in a time axis direction and a frequency axis direction;
a complex division circuit for performing at a prescribed timing a complex division of the information transmis- sion signal received from the memory interface by a result obtained from the carrier interpolation circuit;

a plurality of circuits for performing interpolation in the time axis direction, and the plurality of circuits being selectable according to a reception condition wherein one of the circuits for performing interpolation in the time axis direction uses a diagonal interpolation method; and a circuit for detecting an end in the diagonal interpolation method; and a circuit for changing only a processing at the end to a time axis linear interpolation method.

2. An OFDM (Orthogonal Frequency Division Multiplexing) demodulator in a receiving apparatus for receiving an OFDM signal, wherein the OFDM signal is a signal in which a scattered pilot signal is placed at a prescribed symbol interval in a time axis direction and at a prescribed carrier interval in a frequency axis direction, a continuous pilot signal and a control information signal are placed at a prescribed carrier position, and an information transmission signal is placed in a remaining portion, the OFDM demodulator comprising:

an FFT (Fast Fourier Transform) circuit for performing a fast Fourier transform on the OFDM signal;

a circuit for extracting a scattered pilot signal from the fast Fourier transformed signal;

a circuit for adding a phase to the extracted scattered pilot signal based on a position of the scattered pilot signal from a transmitting party;

a memory for temporarily storing the phase-added scattered pilot signal and the information transmission signal;

a memory interface for conducting write operation to the memory at a prescribed timing, starting read operation when a prescribed number of scattered pilot signals have been written and outputting the scattered pilot signals, and starting read operation at another timing and outputting the written information transmission signal;

a carrier interpolation circuit for matching the phase of the scattered pilot signals received from the memory interface and performing interpolation in a time axis direction and a frequency axis direction;

a complex division circuit for performing at a prescribed timing a complex division of the information transmission signal received from the memory interface by a result obtained from the carrier interpolation circuit;

a plurality of circuits for performing interpolation in the time axis direction, and the plurality of circuits being selectable according to a reception condition, wherein one of the circuits for performing interpolation in the time axis direction uses a diagonal interpolation method; and a circuit for detecting an end in the diagonal interpolation method; a circuit for storing data at the end; a circuit for detecting a portion relating to data resulting from frequency axis interpolation at the end; and a circuit for replacing the portion relating to the data resulting from the frequency axis interpolation with the data at the end.

3. An OFDM (Orthogonal Frequency Division Multiplexing) demodulator in a receiving apparatus for receiving an OFDM signal, wherein the OFDM signal is a signal in which a scattered pilot signal is placed at a prescribed symbol interval in a time axis direction and at a prescribed carrier interval in a frequency axis direction, a continuous pilot signal and a control information signal are placed at a prescribed carrier position, and an information transmission signal is placed in a remaining portion, the OFDM demodulator comprising:

an FFT Fast Fourier Transform circuit for performing a fast Fourier transform on the OFDM signal;

a circuit for extracting a scattered pilot signal from the fast Fourier transformed signal;

a circuit for adding a phase to the extracted scattered pilot signal based on a position of the scattered pilot signal from a transmitting party;

a memory for temporarily storing the phase-added scattered pilot signal and the information transmission signal;

a memos interface for conducting write operation to the memory at a prescribed min starting read operation when a prescribed number of scattered pilot signals have been written and outputting the scattered pilot signals, and starting read operation at another timing and outputting the written information transmission signal;

a carrier interpolation circuit for matching the phase of the scattered pilot signals received from the memory interface and performing interpolation in a time axis direction and a frequency axis direction;

a complex division circuit for performing at a prescribed timing a complex division of the information transmission signal received from the memory interface by a result obtained from the carrier interpolation circuit;

a circuit for prestoring an initial address of a memory region in the memory;

a first counter showing a current read symbol position and being incremented by one on a symbol by symbol basis;

a second counter showing from which symbol a scattered pilot signal is to be retrieved with respect to a value of the first counter, and being incremented by one on a symbol by symbol basis in a range of 0 through 3;

a third counter being initialized by a value of the second counter and incremented by one every time a scattered pilot signal is read;

an offset retrieving circuit for selecting the initial address of the memory region by using a value of the first counter and a value of the third counter; and a fourth counter being always initialized at a beginning of a symbol and being incremented by one every time a scattered pilot signal is read, wherein a sum of an output of the offset retrieving circuit and a value of the fourth counter is used as a read address for reading a scattered pilot signal from the memory.

4. An OFDM (Orthogonal Frequency Division Multiplexing) demodulator in a receiving apparatus for receiving an OFDM signal, wherein the OFDM signal is a signal in which a scattered pilot signal is placed at a prescribed symbol interval in a time axis direction and at a prescribed carrier interval in a frequency axis direction, a continuous pilot signal and a control information signal are placed at a prescribed carrier position, and an information transmission signal is placed in a remaining portion, the OFDM demodulator comprising:

an FFT (Fast Fourier Transform) circuit for performing a fast Fourier transform on the OFDM signal;

a circuit for extracting a scattered pilot signal from the fast Fourier transformed signal;

a circuit for adding a phase to the extracted scattered pilot signal based on a position of the scattered pilot signal from a transmitting party;

a memory for temporarily storing the phase-added scattered pilot signal and the information transmission signal;

a memory interface for conducting write operation to the memory at a prescribed timing, starting read operation when a prescribed number of scattered pilot signals have been written and outputting the scattered pilot signals, and starting read operation at another timing and outputting the written information transmission signal;

a carrier interpolation circuit for matching the phase of the scattered pilot signals received from the memory interface and performing interpolation in a time axis direction and a frequency axis direction;

a complex division circuit for performing at a prescribed timing a complex division of the information transmission signal received from the memory interface by a result obtained from the carrier interpolation circuit;

a frequency filter for interpolating a scattered pilot signal in a frequency axis direction, wherein the frequency filter includes a circuit for storing a selection result of a time axis interpolation method, a first counter for counting input data while initializing input data every time a symbol ends, an end signal generation circuit for generating a 1-symbol end signal according to a value of the first counter, a second counter being incremented on a symbol by symbol basis by the end signal generation circuit, an end processing control circuit for conducting end control of a diagonal interpolation method, and a data output selection control circuit being controlled by using an output of the second counter, the stored selection result of the time axis interpolation method, and the end processing control circuit, for recognizing an interval between valid data signals which varies depending on a time axis interpolation method, and selecting valid data input and 0 insertion.

5. The OFDM demodulator according to claim 4, wherein the frequency filter further includes a circuit for automatically selecting a time axis interpolation method from a reception condition.

6. The OFDM demodulator according to claim 4, wherein the frequency filter is an adaptive filter.

7. An OFDM (Orthogonal Frequency Division Multiplexing) demodulator in a receiving apparatus for receiving an OFDM signal, wherein the OFDM signal is a signal in which a scattered pilot signal is placed at a prescribed symbol interval in a time axis direction and at a prescribed carrier interval in a frequency axis direction, a continuous pilot signal and a control information signal are placed at a prescribed carrier position, and an information transmission signal is placed in a remaining portion, the OFDM demodulator comprising:

an FFT (Fast Fourier Transform) circuit for performing a fast Fourier transform on the OFDM signal;

a circuit for extracting a scattered pilot signal from the fast Fourier transformed signal;

a circuit for adding a phase to the extracted scattered pilot signal based on a position of the scattered pilot signal from a transmitting party;

a memory for temporarily storing the phase-added scattered pilot signal and the information transmission signal;

a memory interface for conducting write operation to the memory at a prescribed timing, starting read operation when a prescribed number of scattered pilot signals have been written and outputting the scattered pilot signals, and starting read operation at another timing and outputting the written information transmission signal;

a carrier interpolation circuit for matching the phase of the scattered pilot signals received from the memory interface and performing interpolation in a time axis direction and a frequency axis direction; and a complex division circuit for performing at a prescribed timing a complex division of the information transmission signal received from the memory interface by a result obtained from the carrier interpolation circuit, wherein the memory is divided into two memory regions for an information transmission signal and two memory regions for a scattered pilot signal, a clock is supplied to all the memory regions in one mode and a clock is supplied to either the memory regions for an information transmission signal or the memory regions for a scattered pilot signal in another mode, by providing a status for each memory region, the two memory regions for a scattered pilot signal are used to store an information transmission signal when a received OFDM signal is in a differential mode, and are used to store a scattered pilot signal when a received OFDM signal is in a synchronous mode.

8. An OFDM (Orthogonal Frequency Division Multiplexing) demodulator in a receiving apparatus for receiving an OFDM signal, wherein the OFDM signal is a signal in which a scattered pilot signal is placed at a prescribed symbol interval in a time axis direction and at a prescribed carrier interval in a frequency axis direction, a continuous pilot signal and a control information signal are placed at a prescribed carrier position, and an information transmission signal is placed in a remaining portion, the OFDM demodulator comprising:

an FFT (Fast Fourier Transform) circuit for performing a fast Fourier transform on the OFDM signal;

a circuit for extracting a scattered pilot signal from the fast Fourier transformed signal;

a circuit for adding a phase to the extracted scattered pilot signal based on a position of the scattered pilot signal from a transmitting party;

a memory for temporarily storing the phase-added scattered pilot signal and the information transmission signal;

a memory interface for conducting write operation to the memory at a prescribed timing, starting read operation when a prescribed number of scattered pilot signals have been written and outputting the scattered pilot signals, and starting read operation at another timing and outputting the written information transmission signal;

a carrier interpolation circuit for matching the phase of the scattered pilot signals received from the memory interface and performing interpolation in a time axis direction and a frequency axis direction; and a complex division circuit for performing at a prescribed timing a complex division of the information transmission signal received from the memory interface by a result obtained from the carrier interpolation circuit, wherein when there are N independent read requests using a same scattered pilot signal and having different processing timings, each of M memory regions in the memory has N write completion statuses and N read completion statuses, where M and N are an integer.

9. The OFDM demodulator according to claim 8, further comprising:

a circuit for detecting that both the N write completion statuses and the N read completion statuses in one memory region are completed;

a circuit for detecting that both the N write completion statuses and the N read completion statuses are empty; and a circuit for clearing the N statuses to make the one memory region ready for writing, when it is detected that both the N write completion statuses and the N read completion statuses are completed.

* * * * *